(12) United States Patent
Kawai et al.

(10) Patent No.: US 9,716,272 B2
(45) Date of Patent: Jul. 25, 2017

(54) POSITIVE ELECTRODE COMPOSITION FOR NONAQUEOUS ELECTROLYTE SECONDARY BATTERY, AND METHOD FOR PRODUCING POSITIVE ELECTRODE SLURRY USING THE POSITIVE ELECTRODE COMPOSITION

(75) Inventors: Kenta Kawai, Anan (JP); Kengo Ooishi, Anan (JP); Hisato Sadamasu, Anan (JP); Chika Kinouchi, Anan (JP); Yasuhiro Yoshida, Anan (JP)

(73) Assignee: NICHIA CORPORATION, Anan-Shi (JP)

( * ) Notice: Subject to any disclaimer, the term of this patent is extended or adjusted under 35 U.S.C. 154(b) by 46 days.

(21) Appl. No.: 13/164,359

(22) Filed: Jun. 20, 2011

(65) Prior Publication Data

US 2011/0315918 A1 Dec. 29, 2011

(30) Foreign Application Priority Data

Jun. 22, 2010 (JP) ................. 2010-141828
May 17, 2011 (JP) ................. 2011-109958

(51) Int. Cl.
*H01M 4/525* (2010.01)
*H01M 4/505* (2010.01)

(52) U.S. Cl.
CPC ........... *H01M 4/525* (2013.01); *H01M 4/505* (2013.01)

(58) Field of Classification Search
USPC ... 429/321.95, 232, 223, 224, 221, 220, 212
See application file for complete search history.

(56) References Cited

U.S. PATENT DOCUMENTS

| | | | |
|---|---|---|---|
| 6,183,911 B1 | 2/2001 | Kweon et al. | |
| 6,730,435 B1 | 5/2004 | Nakane et al. | |
| 8,916,292 B2 * | 12/2014 | Song | H01M 4/0404 429/212 |
| 2003/0082453 A1 * | 5/2003 | Numata et al. | 429/231.95 |
| 2006/0046143 A1 * | 3/2006 | Nakai et al. | 429/231.1 |
| 2006/0083988 A1 | 4/2006 | Deguchi et al. | |
| 2007/0141470 A1 | 6/2007 | Nakura | |
| 2007/0207383 A1 * | 9/2007 | Ohzuku | H01M 4/505 429/223 |
| 2008/0070122 A1 | 3/2008 | Park et al. | |
| 2008/0090150 A1 | 4/2008 | Nakura | |

FOREIGN PATENT DOCUMENTS

| | | |
|---|---|---|
| CA | 2373756 A1 | 11/2000 |
| JP | 2000-106174 | 4/2000 |
| JP | 2000-268812 | 9/2000 |
| JP | 2002-075367 | 3/2002 |
| JP | 2003-500318 | 1/2003 |
| JP | 2003-142101 | 5/2003 |
| JP | 2006-331939 | * 12/2006 |
| JP | 2006331939 A | 12/2006 |
| JP | 2007-188878 | 7/2007 |
| JP | 2009-032647 | * 2/2009 |
| JP | 2011-060605 | 3/2011 |
| JP | 2011-146158 | 7/2011 |
| WO | WO-2011/078263 A1 | 6/2011 |

OTHER PUBLICATIONS

English Translation of the International Search Report cited in related International Patent Application No. PCT/JP2011/063806, completed Sep. 9, 2011.
EPO Communication pursuant to Rule 114(2) issued in Application No. 11798042.5 dated Nov. 17, 2014.
"Acidic oxide", Wikipedia, retrieved from URL:https://en.wikipedia.org/wiki/Acidic_oxide, last Modified on Sep. 11, 2015.
Extended European Search Report dated Oct. 27, 2015 issued in EP11798042.

* cited by examiner

*Primary Examiner* — Monique Peets
(74) *Attorney, Agent, or Firm* — Foley & Lardner LLP

(57) ABSTRACT

A positive electrode composition comprises a positive electrode active material composed of a lithium transition metal complex oxide represented by the general formula $Li_{1+x}Ni_yCo_zM_{1-y-z-w}L_wO_2$ (wherein $0 \leq x \leq 0.50$, $0.30 \leq y \leq 1.0$, $0 < z \leq 0.5$, $0 \leq w \leq 0.1$, $0.30 < y+z+w \leq 1$, M represents at least one kind selected from Mn and Al, and L represents at least one kind of an element selected from the group consisting of Zr, Ti, Mg and W), and additive particles composed of acidic oxide particles.

6 Claims, 2 Drawing Sheets

Time-dependent change in viscosity of positive electrode slurry

Content of metallic element and/or semi-metallic element versus residual LiOH

POSITIVE ELECTRODE COMPOSITION FOR NONAQUEOUS ELECTROLYTE SECONDARY BATTERY, AND METHOD FOR PRODUCING POSITIVE ELECTRODE SLURRY USING THE POSITIVE ELECTRODE COMPOSITION

BACKGROUND OF THE INVENTION

Field of the Invention

The present invention relates to a positive electrode composition for a nonaqueous electrolyte secondary battery such as a lithium ion secondary battery. Particularly, the present invention relates to a positive electrode composition that can improve output power characteristics of a lithium ion secondary battery, and also can improve viscosity stability of a positive electrode slurry. The present invention also relates to a method for producing a positive electrode slurry having improved viscosity stability.

Description of the Related Art

With the progress in spread and miniaturization of mobile devices such as VTR, mobile phone and note PC, a nonaqueous electrolyte secondary battery such as a lithium ion secondary battery has recently been used as a power supply therefore. Furthermore, in order to cope with a recent environmental problem, the nonaqueous electrolyte secondary battery has also attracted special interest as a power battery of an electric vehicle or the like.

Commonly, there has widely been used, as a positive electrode active material for a lithium ion secondary battery, $LiCoO_2$ (lithium cobalt oxide) that can constitutes a 4 V-class secondary battery. When $LiCoO_2$ is used as the positive electrode active material, it is put in practical use at a discharge capacity of about 160 mA/g.

Cobalt as a raw material of $LiCoO_2$ is a scarce resource and is also unevenly distributed, which leads to high costs, and which may cause anxiety about supply of a raw material.

In response to these circumstances, $LiNiO_2$ (lithium nickel oxide) also has been examined. Practically, $LiNiO_2$ can realize a 4 V-class secondary battery having a discharge capacity of about 200 mA/g. However, there is a problem with stability of a crystal structure of a positive electrode active material upon charge and discharge.

Thus, there also has been made a study of realizing a discharge capacity at the same level as that of $LiCoO_2$ at low cost while improving stability of a crystal structure by substituting nickel atoms of $LiNiO_2$ with other elements. For example, it is considered that $LiNi_{0.33}Co_{0.33}Mn_{0.33}O_2$ is more advantageous than $LiCoO_2$ in the respect of costs.

Furthermore, there has also been proposed $LiNi_{0.5}Co_{0.2}Mn_{0.3}O_2$ in which costs are reduced by decreasing the proportion of Co and a discharge capacity are improved by increasing the proportion of Ni. However, deterioration of output power characteristics is not commonly avoided when the proportion of Co decreases. Thus, there has been proposed a technology in which a disorder Ni atom arrangement in a crystal structure is reduced by making Li more excessive than a stoichiometric ratio, thereby compensating output power characteristics.

[Patent Document 1] JP-A-2007-188878
[Patent Document 2] JP-A-2002-075367
[Patent Document 3] JP-A-2000-106174
[Patent Document 4] JP-A-2003-142101

By the way, a positive electrode of a nonaqueous electrolyte secondary battery is formed by mixing a positive electrode active material with a binder such as polyvinylidene fluoride (PVDF) or N-methyl-2-pyrrolidone (NMP) to obtain a positive electrode slurry, and applying the positive electrode slurry to a current collector such as an aluminum foil. At this time, when lithium is released from the positive electrode active material, the lithium reacts with moisture contained in the binder to form lithium hydroxide. The thus formed lithium hydroxide reacts with the binder and thus the positive electrode slurry undergoes gelation, resulting in poor operability and a decrease in a yield. This tendency becomes remarkable when the proportion of lithium in the positive electrode active material is more excessive than a stoichiometric ratio and also the proportion of nickel is high.

SUMMARY OF THE INVENTION

Under these circumstances, the present invention has been made. An object of the present invention is to provide a positive electrode composition that has improved output power characteristics and low costs, and is also easily handled upon production of a positive electrode and exhibits an improved yield.

In order to achieve the above object, the present inventors have intensively studied, and thus the present invention has been completed. The present inventors have found that gelation of a positive electrode slurry can be suppressed by mixing a positive electrode active material composed of a lithium transition metal complex oxide having a specific composition with particles composed of an acidic oxide (hereinafter may also be referred to as additive particles) to obtain a positive electrode composition. It has also been found that output power characteristics are improved.

It has also been found that the gelation is suppressed by producing the positive electrode slurry by obtaining the positive electrode composition in advance and then dispersing and dissolving in a dispersion medium, together with a binder, and thus output power characteristics are improved in a nonaqueous electrolyte secondary battery after coating. Alternatively, the positive electrode slurry may be produced by dispersing and dissolving the positive electrode active material, the additive particles and a binder in a dispersion medium so that the positive electrode active material meets the binder in the presence of the additive particles.

The positive electrode composition of the present invention comprises a positive electrode active material composed of a lithium transition metal complex oxide represented by the general formula $Li_{1+x}Ni_yCo_zM_{1-y-z-w}L_wO_2$ (wherein $0 \le x \le 0.50$, $0.30 \le y \le 1.0$, $0 < z \le 0.5$, $0 \le w \le 0.1$, $0.30 < y+z+w \le 1$, M represents at least one kind selected from Mn and Al, and L represents at least one kind of an element selected from the group consisting of Zr, Ti, Mg and W), and additive particles composed of acidic oxide particles.

It is preferred that the acidic oxide particles are composed of at least one kind selected from the group consisting of tungsten oxide, molybdenum oxide, vanadium pentoxide, tin dioxide and boron oxide.

It is preferred that the content of the acidic oxide particles is 5.0 mol % or less expressed in terms of a ratio of a metallic element and/or a semi-metallic element in the acidic oxide particles to the positive electrode active material.

The method for producing a positive electrode slurry of the present invention comprises a step of mixing a positive electrode active material composed of a lithium transition metal complex oxide represented by the general formula: $Li_{1+x}Ni_yCo_zM_{1-y-z-w}L_wO_2$ ($0 \le x \le 0.50$, $0.30 \le y \le 1.0$, $0 < z \le 0.5$, $0 \le w \le 0.1$, $0.30 < y+z+w \le 1$, M represents at least one kind selected from Mn and Al, and L represents at least one kind of an element selected from the group consisting of Zr, Ti, Mg and W) with additive particles composed of acidic oxide particles to obtain a positive electrode composition; and a step of mixing the positive electrode composition, a binder and a dispersion medium to obtain a positive electrode slurry.

Since the positive electrode composition of the present invention has the aforementioned features, the positive electrode slurry does not undergo gelation upon production of a positive electrode, and thus operability is improved and a yield increases. Use of the positive electrode active material of the present invention in the positive electrode enables the production of an aqueous electrolyte secondary battery having improved output power characteristics at low cost.

Since the method for producing a positive electrode slurry of the present invention has the aforementioned features, gelation upon production is suppressed and a production yield increases. Also, output power characteristics of the nonaqueous electrolyte secondary battery produced by coating the positive electrode slurry are improved.

While not intending to be bound by any specific theory, a relationship between the aforementioned constitution and effects is generally estimated as follows. That is, lithium is eluted from a positive electrode active material in a positive electrode slurry upon the production of a positive electrode, and lithium reacts with moisture contained in a binder to form lithium hydroxide. The thus formed lithium hydroxide preferentially reacts with an acidic oxide, thereby suppressing a reaction between the thus formed lithium hydroxide and a binder. Thus, gelation of the positive electrode slurry is suppressed. Furthermore, the acidic oxide fulfills a role as a conductive agent in a positive electrode, whether the acidic oxide reacts with lithium hydroxide or not, and decreases resistance of the entire positive electrode and thus it contributes to an improvement in output power characteristics of the battery.

DETAILED DESCRIPTION OF THE INVENTION

Figure 1:
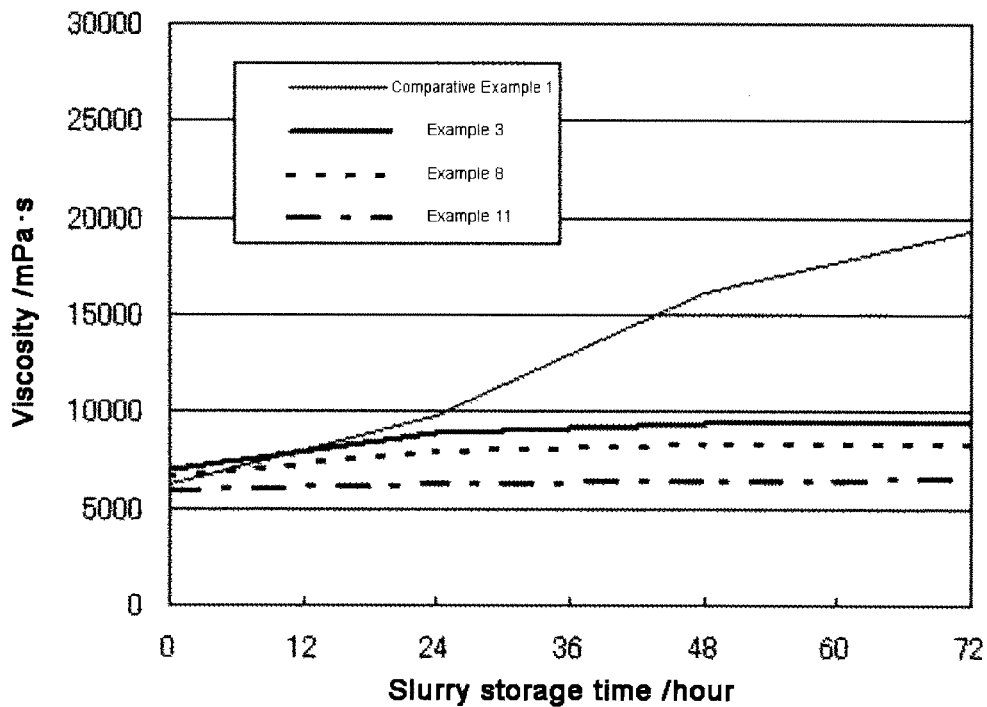
FIG. 1 shows a time-dependent change in viscosity of positive electrode slurries prepared using a positive electrode composition of Examples 3, 8, 11 and Comparative Example 1.

The positive electrode composition of the present invention will be described in detail by way of embodiments and Examples. However, the present invention is not limited to these embodiments and Examples.

The positive electrode composition of the present invention includes a positive electrode active material composed of a lithium transition metal complex oxide containing essentially lithium and nickel, and additive particles composed of acidic oxide particles.

The composition of the positive electrode active material is represented by the general formula: $Li_{1+x}Ni_yCo_zM_{1-y-z-w}L_wO_2$ ($0 \leq x \leq 0.50$, $0.30 \leq y \leq 1.0$, $0 < z \leq 0.5$, $0 \leq w \leq 0.1$, $0.30 < y+z+w \leq 1$, M represents at least one kind selected from Mn and Al, and L represents at least one kind of an element selected from the group consisting of Zr, Ti, Mg and W). x is preferably as large as possible from the viewpoint of output power characteristics. However, when x is more than 0.5, owing to the increased amount of the unreacted Li component, particles are sintered in a calcination step, which results in difficulty in producing. Therefore, a substantial upper limit of x is 0.5. When y is less than 0.3, it is disadvantageous from the viewpoint of output power characteristics, and thus y is preferably 0.3 or more. When z is more than 0.5, cost advantage cannot be found, and thus z is preferably 0.5 or less for the purpose of cost reduction. When the additive amount of a metallic element L increase, the capacity decreases and thus w is preferably 0.001 or more and 0.1 or less. Based on these facts, more preferable ranges are comprehensively as follows: $0 < x \leq 0.2$, $0.3 \leq y \leq 0.8$, $0 < z \leq 0.35$, and $0.001 < w < 0.1$.

Furthermore, Li, Ni, Co, M sites may be substituted with the other element L for another purpose. L is preferably Zr from the viewpoint of storage characteristics. At least one kind of an element of Ti or Mg is preferred from the viewpoint of cycle characteristics. At least one kind of an element of Zr or W is particularly preferred since output power characteristics are remarkably improved by a combination with an acidic oxide that constitutes the present invention.

The acidic oxide refers to an oxide that reacts with a base (alkali) to form a salt. In the present specification, an amphoteric oxide is also included in the acidic oxide from the viewpoint of reacting with a base. Examples of the metallic element and/or semi-metallic element that form(s) the acidic oxide include tungsten, molybdenum, vanadium, tin, boron, manganese, tellurium, aluminum, zinc, magnesium and the like. From the viewpoint of reactivity with lithium hydroxide, electrical conduction property before and after the reaction of a substance and the like, tungsten, molybdenum, vanadium, tin and boron are preferred. Among these elements, tungsten and molybdenum are particularly preferred.

The method for producing a positive electrode composition of the present invention will be described below. The positive electrode composition can be obtained by well mixing the positive electrode active material with additive particles. A mechanochemically coating layer may also be formed by stirring at a high speed. However, it is sufficient when mixed as long as drastic uneven distribution does not arise.

There is no particular limitation on the mixed amount of acidic oxide particles. However, when the mixed amount is too small, the gelation suppression effect of the positive electrode slurry and output power characteristics are insufficient. In contrast, when the mixed amount is too large, the proportion of the positive electrode active material in the positive electrode only decreases, and thus the mixed amount is appropriately adjusted depending on the purposes.

Figure 3:
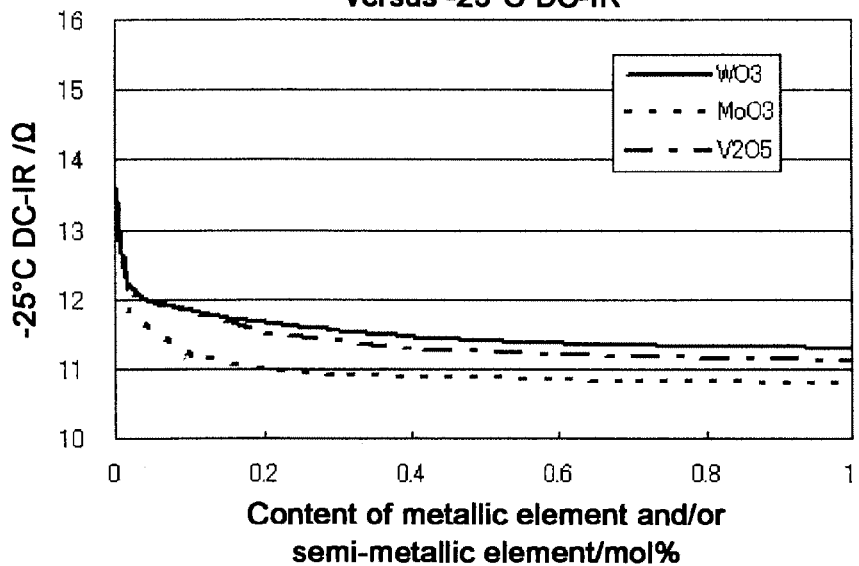
FIG. 3 shows a correlation between the content of an acidic oxide (in terms of the content of a metallic element and/or a semi-metallic element) in a positive electrode composition, and the DC internal resistance (DC-IR).

Taking the amount of a binder and the amount of positive electrode active material upon the production of a positive electrode into consideration, the content of acidic oxide particles in the positive electrode composition is preferably 5.0 mol % or less expressed in terms of a ratio of the metallic element and/or semi-metallic element in the acidic oxide particles to the positive electrode active material since various characteristics are well balanced. The content is more preferably 0.01 mol % or more and 1.0 mol % or less (refer to FIG. 3).

The median diameter of acidic oxide particles in the positive electrode composition is preferably as small as possible. However, when the median diameter is too small, acidic oxide particles tend to aggregate, and therefore the median diameter is appropriately adjusted. The median diameter is preferably from 0.1 μm to 2 μm, and more preferably from 0.5 μm to 1.5 μm. It is preferred that the median diameter of the positive electrode active material in the positive electrode composition is relatively larger than that of the acidic oxide particles. Taking balance with other characteristics into consideration, furthermore, the median diameter is preferably from 4 μm to 8 μm.

The positive electrode active material can be appropriately produced by a known technique. For example, the positive electrode active material can be obtained by mixing raw material powders each containing constituent elements capable of being decomposed at a high temperature into an oxide using a mixer, and calcining the obtained mixture at 700° C. to 1,100° C.

The positive electrode slurry of the present invention is produced by mixing the positive electrode composition produced by the aforementioned method with a binder and a dispersion medium. Alternatively, the positive electrode slurry may be produced by dispersing and dissolving the positive electrode active material, the additive particles and a binder in a dispersion medium so that the positive electrode active material meets the binder in the presence of the additive particles. It is possible to use, as the binder, for example, polyvinylidene fluoride (PVDF), polytetrafluoroethylene (PTFE) and the like. The binder is preferably mixed in the proportion of 2% by weight or more and 10% by weight or less. It is possible to use, as the dispersion medium, for example, N-methyl-2-pyrrolidone (NMP). In addition to the binder and the dispersion medium, a conductive agent such as acetylene black may be mixed. The conductive agent is preferably mixed in the proportion of 2% by weight or more and 10% by weight or less.

Example 1

In a reaction vessel, pure water is prepared with stirring, and an aqueous nickel sulfate solution, an aqueous cobalt sulfate solution and an aqueous manganese sulfate solution are added dropwise at a flow rate ratio Ni:Co:Mn of 5:2:3 in terms of a molar ratio. After completion of the dropwise addition, a liquid temperature is adjusted to 65° C. and a given amount of an aqueous sodium hydroxide solution is added dropwise to obtain a nickel-cobalt-manganese coprecipitated hydroxide. The obtained coprecipitated hydroxide is washed with water, filtered, separated and then mixed with lithium carbonate and zirconium oxide (IV) so that Li:(Ni+Co+Mn):Zr becomes 1.10:1:0.005 to obtain a mixed raw material. The obtained mixed raw material is calcined under the atmosphere at 850° C. for 2.5 hours and then calcined at 900° C. for 4.5 hours to obtain a sintered body. The obtained sintered body is ground and subjected to dry sieving to obtain a positive electrode active material represented by the composition formula: $Li_{1.10}Ni_{0.5}Co_{0.2}Mn_{0.3}Zr_{0.005}O_2$. The obtained positive electrode active material has a median diameter of 6.0 μm.

The obtained positive electrode active material is mixed with tungsten oxide (VI) having a median diameter of 1.0 μm as additive particles using a high-speed shear-type mixer so that (Ni+Co+Mn+Zr):W becomes 1:0.001 to obtain a positive electrode composition.

Example 2

In the same manner as in Example 1, except for mixing with tungsten oxide (VI) as additive particles so that (Ni+Co+Mn+Zr):W becomes 1:0.002, a positive electrode composition is obtained.

Example 3

In the same manner as in Example 1, except for mixing with tungsten oxide (VI) as additive particles so that (Ni+Co+Mn+Zr):W becomes 1:0.003, a positive electrode composition is obtained.

Example 4

In the same manner as in Example 1, except for mixing with tungsten oxide (VI) as additive particles so that (Ni+Co+Mn+Zr):W becomes 1:0.005, a positive electrode composition is obtained.

Example 5

In the same manner as in Example 1, except for mixing with tungsten oxide (VI) as additive particles so that (Ni+Co+Mn+Zr):W becomes 1:0.010, a positive electrode composition is obtained.

Example 6

In the same manner as in Example 1, except for mixing with molybdenum oxide (VI) having a median diameter of 1.0 μm as additive particles so that (Ni+Co+Mn+Zr):Mo becomes 1:0.001, a positive electrode composition is obtained.

Example 7

In the same manner as in Example 6, except for mixing with molybdenum oxide (VI) as additive particles so that (Ni+Co+Mn+Zr):Mo becomes 1:0.002, a positive electrode composition is obtained.

Example 8

In the same manner as in Example 6, except for mixing with molybdenum oxide (VI) as additive particles so that (Ni+Co+Mn+Zr):Mo becomes 1:0.003, a positive electrode composition is obtained.

Example 9

In the same manner as in Example 6, except for mixing with molybdenum oxide (VI) as additive particles so that (Ni+Co+Mn+Zr):Mo becomes 1:0.006, a positive electrode composition is obtained.

Example 10

In the same manner as in Example 6, except for mixing with molybdenum oxide (VI) as additive particles so that (Ni+Co+Mn+Zr):Mo becomes 1:0.010, a positive electrode composition is obtained.

Example 11

In the same manner as in Example 1, except for mixing with vanadium oxide (VI) having a median diameter of 1.0 μm as additive particles so that (Ni+Co+Mn+Zr):V becomes 1:0.004, a positive electrode composition is obtained.

Comparative Example 1

Only the positive electrode active material in Example 1 is regarded as Comparative Example.

Figure 4:
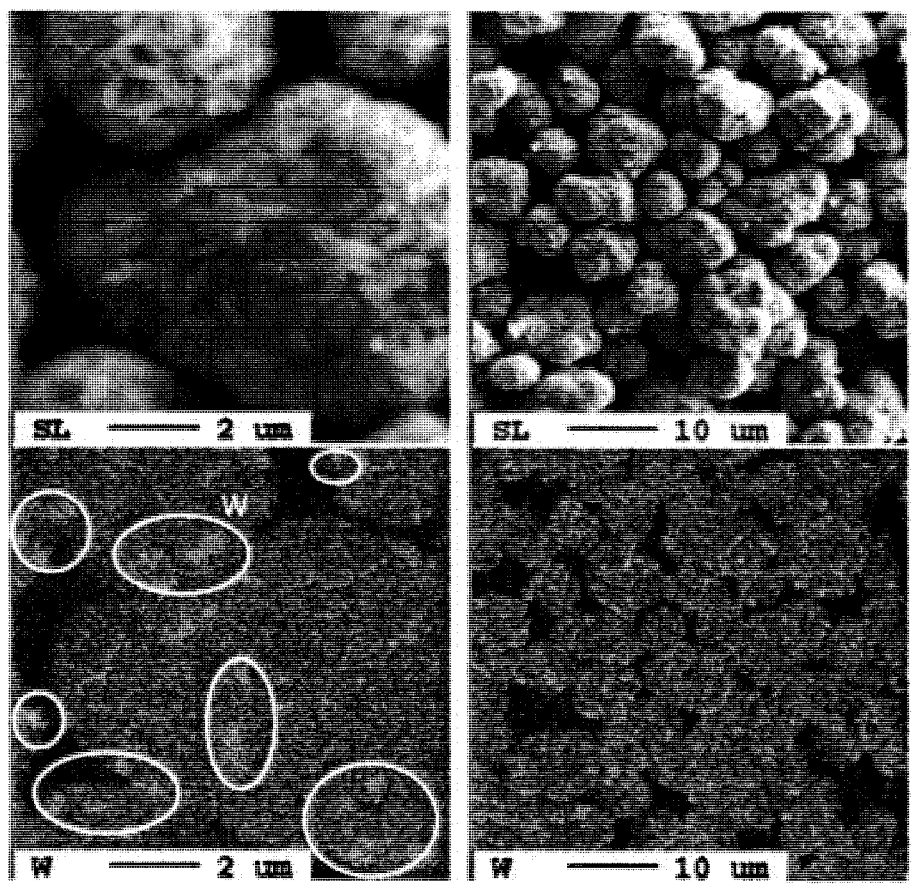
FIG. 4 is a result of two-dimensional concentration mapping analysis of EPMA, showing an example of distribution of acidic oxide particles in a positive electrode composition.

The results of two-dimensional concentration mapping analysis of EPMA are shown in FIG. 4, with respect to the positive electrode composition of Example 1. As is apparent from FIG. 4, tungsten oxide (VI) particles having a particle size of about 1 μm are almost uniformly distributed in the positive electrode composition. Also, with respect to other Examples, almost the same results are obtained.

With respect to Examples 1 to 11 and Comparative Example 1, the residual amount of LiOH in the positive electrode composition is measured by the following method.

First, 10.0 g of a positive electrode composition (or a positive electrode active material for comparison) is placed in a styrol bottle with a cap and 50 ml of pure water is added and then the bottle is capped, followed by shaking with stirring for 1 hour. After completion of the stirring, the supernatant is filtered with a 5C-type filter paper. An initial filtrate (several ml) is discarded and 20 ml of the subsequent filtrate is collected in a test tube. The collected filtrate is transferred to a 200 ml conical beaker diluted with 50 ml of pure water. To the dilution, a 1% phenolphthalein solution is added and 0.025 N sulfuric acid is added dropwise until the solution becomes transparent. Based on the amount of 0.025 N sulfuric acid used in titration, the residual amount of LiOH in the positive electrode composition is calculated.

With respect to Examples 1 to 11 and Comparative Example 1, a viscosity of the positive electrode slurry is measured in the following manner.

A positive electrode composition (30 g), 1.57 g of PVDF and 12.48 g of NMP are placed in a 150 ml polyethylene container and kneaded at a normal temperature (about 25° C.) for 5 minutes. After kneading, the viscosity of the obtained slurry is immediately measured by an E-type viscometer. Using a corn plate-type blade as a blade, the measurement is carried out by a rotor at a rotary speed of 5 rpm. Thus, a measured value of an initial viscosity is obtained.

Next, the slurry in the polyethylene container is left in a constant temperature bath at 60° C. After 24 hours, 48 hours and 72 hours, the viscosity is measured again by the E-type viscometer. Before the measurement, the slurry is kneaded at a normal temperature for 2 minutes.

With respect to Examples 1 to 11 and Comparative Example 1, DC-IR is measured in the following manner.

A positive electrode slurry is prepared by dispersing 85 parts by weight of a positive electrode composition, 10 parts by weight of acetylene black and 5.0 parts by weight of PVDF in NMP. The obtained positive electrode slurry is coated on an aluminum foil, dried, compression-formed by a roll press and then cut into a given size to obtain a positive electrode.

A negative electrode slurry is prepared by dispersing 90 parts by weight of lithium titanate, 3 parts by weight of acetylene black, 2.0 parts by weight of a vapor phase growing carbon fiber (VGCF, registered trademark) and 5.0 parts by weight of PVDF in NMP. The obtained negative electrode slurry is coated on an aluminum foil, dried, compression-formed by a roll press and then cut into a given size to obtain a negative electrode.

Ethylene carbonate (EC) is mixed with methylethyl carbonate (MEC) at a volume ratio of 3:7 to obtain a solvent. Lithium hexafluorophosphate ($LiPF_6$) is dissolved in the obtained mixed solvent so that the concentration becomes 1 mol/l to obtain a nonaqueous electrolyte.

A lead electrode was respectively attached to current collectors of the aforementioned positive and negative electrodes, followed by vacuum drying at 120° C. Then, a separator made of porous polyethylene is provided between the positive electrode and the negative electrode, and they are placed in a bag-shaped laminate pack. After that, moisture adsorbed to each member is removed by vacuum drying at 60° C. After vacuum drying, the aforementioned nonaqueous electrolyte is injected into the laminate pack, followed by sealing to obtain a laminate-type nonaqueous electrolyte secondary battery for evaluation.

The obtained battery is aged with a micro current thereby allowing the electrolyte to permeate sufficiently into the positive and negative electrodes. Then, a high current is applied and a micro current is applied again. Charge-discharge is carried out ten times in total. A batter capacity on the 10th charge is regarded as (1) and then battery is charged to 40% of (1).

In a constant temperature bath set at 25° C., the aforementioned battery charged to 40% is disposed, and a current of 0.04 A, 0.08 A, 0.12 A, 0.16 A and 0.20 A is alternately applied in a charge direction and a discharge direction. A voltage in case of applying the current in the discharge direction is used. The abscissa denotes a current value applied, whereas, the ordinate denotes an attained voltage, and a gradient of a straight line connecting intersection points is regarded as a 25° C. DC-IR value.

After the measurement of 25° C. DC-IR, the battery was discharged and then charged to 40% of (1). After charging, the battery is put in a constant temperature bath set at −25° C. and is left for 6 hours, and then a current of 0.02 A, 0.04 A and 0.06 A is applied in a discharge direction. The abscissa denotes a current value applied, whereas, the ordinate denotes an attained voltage, and a gradient of a straight line connecting intersection points is regarded as a −25° C. DC-IR value.

With respect to Examples 1 to 11 and Comparative Example 1, a lithium component eluted from a positive electrode active material and a change in viscosity of a positive electrode slurry are shown in Table 1, and a discharge capacity of a battery, a 25° C. DC-IR value and a −25° C. DC-IR value are shown in Table 2. A state of a time-dependent change in viscosity of a positive electrode slurry is shown in FIG. 1.

TABLE 1

|  | Positive electrode active material | Additive particles | Additive amount*/ (mol %) | Residual LiOH/% by weight | Slurry viscosity/(mPa · s) | | | |
|---|---|---|---|---|---|---|---|---|
|  |  |  |  |  | After 0 hour | After 24 hours | After 48 hours | After 72 hours |
| Example 1 | $Li_{1.10}Ni_{0.5}Co_{0.2}Mn_{0.3}Zr_{0.005}O_2$ | $WO_3$ | 0.1 | 0.05 | 6,780 | 8,880 | 9,150 | 9,240 |
| Example 2 | $Li_{1.10}Ni_{0.5}Co_{0.2}Mn_{0.3}Zr_{0.005}O_2$ | $WO_3$ | 0.2 | 0.03 | 6,820 | 8,910 | 9,300 | 9,360 |
| Example 3 | $Li_{1.10}Ni_{0.5}Co_{0.2}Mn_{0.3}Zr_{0.005}O_2$ | $WO_3$ | 0.3 | <0.01 | 6,980 | 8,900 | 9,460 | 9,490 |
| Example 4 | $Li_{1.10}Ni_{0.5}Co_{0.2}Mn_{0.3}Zr_{0.005}O_2$ | $WO_3$ | 0.5 | <0.01 | 7,420 | 9,920 | 10,500 | 10,700 |
| Example 5 | $Li_{1.10}Ni_{0.5}Co_{0.2}Mn_{0.3}Zr_{0.005}O_2$ | $WO_3$ | 1.0 | <0.01 | 6,740 | 9,440 | 9,550 | 9,660 |
| Example 6 | $Li_{1.10}Ni_{0.5}Co_{0.2}Mn_{0.3}Zr_{0.005}O_2$ | $MoO_3$ | 0.1 | 0.08 | 6,480 | 6,950 | 7,760 | 7,930 |
| Example 7 | $Li_{1.10}Ni_{0.5}Co_{0.2}Mn_{0.3}Zr_{0.005}O_2$ | $MoO_3$ | 0.2 | 0.01 | 6,540 | 7,230 | 7,990 | 8,150 |
| Example 8 | $Li_{1.10}Ni_{0.5}Co_{0.2}Mn_{0.3}Zr_{0.005}O_2$ | $MoO_3$ | 0.3 | <0.01 | 6,620 | 7,860 | 8,210 | 8,280 |
| Example 9 | $Li_{1.10}Ni_{0.5}Co_{0.2}Mn_{0.3}Zr_{0.005}O_2$ | $MoO_3$ | 0.6 | <0.01 | 7,380 | 8,100 | 8,500 | 8,650 |
| Example 10 | $Li_{1.10}Ni_{0.5}Co_{0.2}Mn_{0.3}Zr_{0.005}O_2$ | $MoO_3$ | 1.0 | <0.01 | 7,460 | 8,820 | 9,130 | 9,220 |
| Example 11 | $Li_{1.10}Ni_{0.5}Co_{0.2}Mn_{0.3}Zr_{0.005}O_2$ | $V_2O_5$ | 0.4 | <0.01 | 5,840 | 6,260 | 6,410 | 6,480 |
| Comparative Example 1 | $Li_{1.10}Ni_{0.5}Co_{0.2}Mn_{0.3}Zr_{0.005}O_2$ | — | — | 0.14 | 6,240 | 9,800 | 16,100 | 19,300 |

*The additive amount is expressed in terms of the proportion of a metallic element and/or a semi-metallic element based on a positive electrode active material.

TABLE 2

|  | Positive electrode active material | Additive particles | Additive amount*/(mol %) | DC-IR/Ω | |
|---|---|---|---|---|---|
|  |  |  |  | At 25° C. | At −25° C. |
| Example 1 | $Li_{1.10}Ni_{0.5}Co_{0.2}Mn_{0.3}Zr_{0.005}O_2$ | $WO_3$ | 0.1 | 1.46 | 11.9 |
| Example 2 | $Li_{1.10}Ni_{0.5}Co_{0.2}Mn_{0.3}Zr_{0.005}O_2$ | $WO_3$ | 0.2 | 1.39 | 11.8 |
| Example 3 | $Li_{1.10}Ni_{0.5}Co_{0.2}Mn_{0.3}Zr_{0.005}O_2$ | $WO_3$ | 0.3 | 1.37 | 11.7 |
| Example 4 | $Li_{1.10}Ni_{0.5}Co_{0.2}Mn_{0.3}Zr_{0.005}O_2$ | $WO_3$ | 0.5 | 1.31 | 11.4 |
| Example 5 | $Li_{1.10}Ni_{0.5}Co_{0.2}Mn_{0.3}Zr_{0.005}O_2$ | $WO_3$ | 1.0 | 1.42 | 11.3 |
| Example 6 | $Li_{1.10}Ni_{0.5}Co_{0.2}Mn_{0.3}Zr_{0.005}O_2$ | $MoO_3$ | 0.1 | 1.46 | 11.2 |
| Example 7 | $Li_{1.10}Ni_{0.5}Co_{0.2}Mn_{0.3}Zr_{0.005}O_2$ | $MoO_3$ | 0.2 | 1.45 | 11.0 |
| Example 8 | $Li_{1.10}Ni_{0.5}Co_{0.2}Mn_{0.3}Zr_{0.005}O_2$ | $MoO_3$ | 0.3 | 1.47 | 10.9 |
| Example 9 | $Li_{1.10}Ni_{0.5}Co_{0.2}Mn_{0.3}Zr_{0.005}O_2$ | $MoO_3$ | 0.6 | 1.50 | 10.9 |
| Example 10 | $Li_{1.10}Ni_{0.5}Co_{0.2}Mn_{0.3}Zr_{0.005}O_2$ | $MoO_3$ | 1.0 | 1.55 | 10.8 |
| Example 11 | $Li_{1.10}Ni_{0.5}Co_{0.2}Mn_{0.3}Zr_{0.005}O_2$ | $V_2O_5$ | 0.4 | 1.39 | 11.1 |
| Comparative Example 1 | $Li_{1.10}Ni_{0.5}Co_{0.2}Mn_{0.3}Zr_{0.005}O_2$ | — | — | 1.45 | 13.6 |

*The additive amount is expressed in terms of the proportion of a metallic element and/or a semi-metallic element based on a positive electrode active material.

Figure 2:
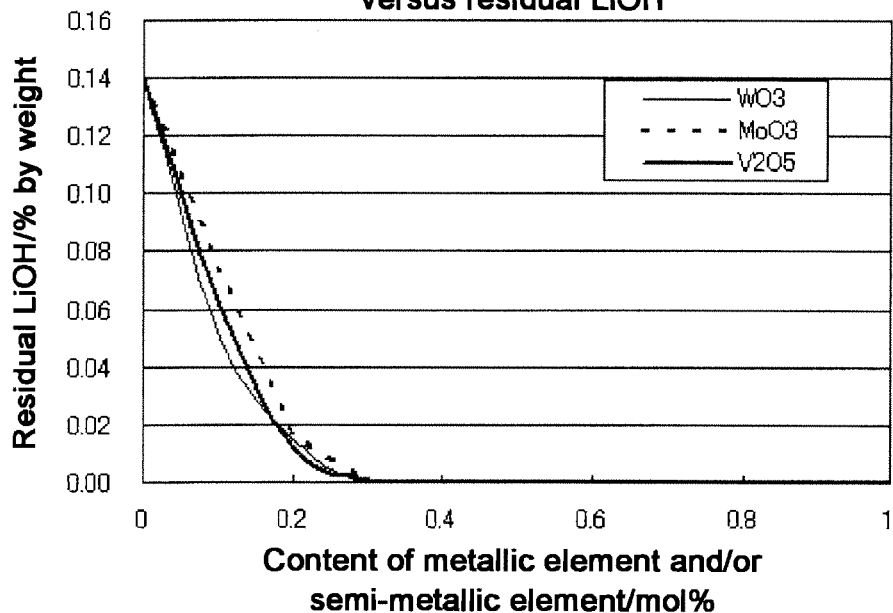
FIG. 2 shows a correlation between the content of an acidic oxide (in terms of the content of a metallic element and/or a semi-metallic element) in a positive electrode composition, and the residual amount of LiOH.

As is apparent from Table 1 and FIG. 2, the content of lithium hydroxide, that can cause gelation of a positive electrode slurry, decreases in positive electrode compositions containing additive particles added therein of Examples 1 to 11 when compared with a positive electrode composition containing no additive particles added therein of Comparative Example 1. As is apparent from Table 1 and FIG. 1, an increase in viscosity is suppressed in positive electrode slurries prepared using a positive electrode composition of Examples 1 to 11 when compared with a positive electrode slurry prepared using a positive electrode composition of Comparative Example 1. Furthermore, as is apparent from Table 2 and FIG. 3, output power characteristics at −25° C. are improved in nonaqueous electrolyte secondary batteries produced using a positive electrode composition of Examples 1 to 11 when compared with a nonaqueous electrolyte secondary battery produced using a positive electrode composition of Comparative Example 1. In contrast, a significant difference is not observed in output power characteristics at 25° C. even in any of Examples 1 to 11 and Comparative Example 1. This reveals that the effects of additive particles are remarkable in a low temperature region.

The positive electrode composition for a nonaqueous electrolyte secondary battery of the present invention can be employed in a nonaqueous electrolyte secondary battery. The nonaqueous electrolyte secondary battery using the positive electrode composition of the present invention has an inexpensive price and improved output power characteristics, and also exhibits satisfactory yield and satisfactory operability, and thus the nonaqueous electrolyte secondary battery can be particularly suited for use not only in mobile devices such as a mobile phone, a note PC and a digital camera, but also in a high-output power supply for large-size applications such as a battery for an electric vehicle.

What is claimed is:

1. A positive electrode composition for a nonaqueous electrolyte secondary battery, the positive electrode composition comprising:
    a positive electrode active material composed of a lithium transition metal complex oxide represented by the general formula $Li_{1+x}Ni_yCo_zM_{1-y-z-w}L_wO_2$ (wherein $0<x\leq0.2$, $0.30\leq y\leq1.0$, $0<z\leq0.5$, $0\leq w\leq0.1$, $0.30<y+z+w\leq1$, M represents at least one kind selected from Mn and Al, and L represents at least one kind of an element selected from the group consisting of Zr, Ti, Mg and W), and
    additive particles consisting of acidic oxide particles,
    wherein the acidic oxide particles are composed of at least one kind selected from the group consisting of tungsten oxide, molybdenum oxide, vanadium pentoxide, and boron oxide, and
    wherein a content of the acidic oxide particles is 5.0 mol % or less expressed in terms of a ratio of a metallic element and/or a semi-metallic element in the acidic oxide particles to the positive electrode active material.

2. The positive electrode composition according to claim 1, wherein a content of acidic oxide particles in the general formula of the positive electrode active material is 0.01 mol % or more and 1.0 mol % or less expressed in terms of a ratio of the metallic element and/or semi-metallic element in the acidic oxide particles to the positive electrode active material.

3. The positive electrode composition according to claim 1, wherein a median diameter of the positive electrode active material is 4 μm to 8 μm and a median diameter of the additive particle is 0.1 μm to 2 μm.

4. A method for producing a positive electrode slurry for a nonaqueous electrolyte secondary battery, the method comprising:

a step of mixing a positive electrode active material composed of a lithium transition metal complex oxide represented by the general formula: $Li_{1+x}Ni_yCo_zM_{1-y-z-w}L_wO_2$ ($0<x\leq0.2$, $0.30\leq y\leq1.0$, $0<z\leq0.5$, $0\leq w\leq0.1$, $0.30<y+z+w\leq1$, M represents at least one kind selected from Mn and Al, and L represents at least one kind of an element selected from the group consisting of Zr, Ti, Mg and W) with additive particles consisting of acidic oxide particles to obtain a positive electrode composition; and a step of mixing the positive electrode composition, a binder and a dispersion medium to obtain a positive electrode slurry, wherein the acidic oxide particles are composed of at least one kind selected from the group consisting of tungsten oxide, molybdenum oxide, vanadium pentoxide, and boron oxide, and wherein a content of the acidic oxide particles is 5.0 mol % or less expressed in terms of a ratio of a metallic element and/or a semi-metallic element in the acidic oxide particles to the positive electrode active material.

5. The method according to claim 4, wherein a content of acidic oxide particles in the general formula of the positive electrode active material is 0.01 mol % or more and 1.0 mol % or less expressed in terms of a ratio of the metallic element and/or semi-metallic element in the acidic oxide particles to the positive electrode active material.

6. The method according to claim 4, wherein a median diameter of the positive electrode active material is 4 μm to 8 μm and a median diameter of the additive particle is 0.1 μm to 2 μm.

* * * * *

UNITED STATES PATENT AND TRADEMARK OFFICE
CERTIFICATE OF CORRECTION

PATENT NO. : 9,716,272 B2  
APPLICATION NO. : 13/164359  
DATED : July 25, 2017  
INVENTOR(S) : Kenta Kawai et al.

Page 1 of 1

It is certified that error appears in the above-identified patent and that said Letters Patent is hereby corrected as shown below:

In the Claims

Column 11, Lines 19-21:
Please remove the line break between "$_{z\text{-}w}$" and "$L_wO_2$".

Signed and Sealed this  
Sixth Day of March, 2018

Andrei Iancu  
*Director of the United States Patent and Trademark Office*